(12) United States Patent
Buthker

(10) Patent No.: US 6,265,841 B1
(45) Date of Patent: Jul. 24, 2001

(54) DEVICE FOR DRIVING A MULTI-PHASE D.C. MOTOR

(75) Inventor: Henricus C. J. Buthker, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/474,300

(22) Filed: Dec. 29, 1999

(30) Foreign Application Priority Data

Dec. 30, 1998 (EP) ................................. 98204493

(51) Int. Cl.[7] ........................................... H02P 7/50
(52) U.S. Cl. ..................... 318/439; 318/254; 388/804
(58) Field of Search .................... 318/138, 254, 318/439, 801; 388/804, 811, 819, 829

(56) References Cited

U.S. PATENT DOCUMENTS

| | | | |
|---|---|---|---|
| 4,528,486 | * 7/1985 | Flaig et al. | 318/254 |
| 4,928,043 | * 5/1990 | Plunkett | 318/254 |
| 5,193,146 | 3/1993 | Kohno | 388/811 |
| 5,274,317 | * 12/1993 | Utley et al. | 318/802 |
| 5,291,106 | * 3/1994 | Murty et al. | 318/375 |
| 5,495,160 | * 2/1996 | Pond | 318/801 |
| 5,640,073 | * 6/1997 | Ikeda et al. | 318/439 |
| 5,859,512 | * 1/1999 | Buthker | 318/254 |

FOREIGN PATENT DOCUMENTS

0419303A1   3/1991   (EP) ................. H02P/6/02

* cited by examiner

Primary Examiner—Robert E. Nappi
Assistant Examiner—Rina I. Duda
(74) Attorney, Agent, or Firm—Edward W. Goodman

(57) ABSTRACT

A device for driving a multi-phase d.c. motor (8) includes a multi-phase inverter (11) for supplying drive signals to the windings (2, 4, 6) of the motor. The multi-phase inverter (11) supplies a first and a second drive signal at a time to at least one winding (2) of the motor. The first and the second drive signal flow in opposite directions in the at least one winding (2). The device further has pulse-width modulators means (40.1–40.6) for applying a first pulse-width modulation to the first drive signal and a second pulse-width modulation to the second drive signal. The pulse-width modulation means (40.1–40.6) are adapted to vary the pulse-width of the pulse-width modulation in order to accelerate, actively decelerate or maintain the speed of the motor 8 and to select a direction of rotation of the motor.

13 Claims, 5 Drawing Sheets

| F | van | naar | FC | A | B | C |
|---|-----|------|----|----|----|----|
| 1 | A | B | C | Pa | Pa | Pv |
| 2 | A | C | B | Pa | Pv | Pa |
| 3 | B | C | A | Pv | Pa | Pa |
| 4 | B | A | C | Pa | Pa | Pv |
| 5 | C | A | B | Pa | Pv | Pa |
| 6 | C | B | A | Pv | Pa | Pa |

DEVICE FOR DRIVING A MULTI-PHASE D.C. MOTOR

BACKGROUND OF THE INVENTION

The invention relates to a device for driving a multi-phase d.c. motor, the device including a multi-phase inverter for applying drive signals to the windings of the motor in such a manner that said windings are recurrently driven in a given sequence by the drive signals, the drive signals being pulse-width modulation to control the speed of the motor.

DESCRIPTION OF THE RELATED ART

A device of the type defined in the opening paragraph is known from, inter alia, European Patent Application 0419303, corresponding to U.S. Pat. No. 5,193,146.

In the known device the amount of power applied to the motor is controlled with the aid of pulse-width modulation. To raise the speed of the motor the amount of power applied to the motor is increased by increasing the pulse-width of the pulse-width modulation. To reduce the speed of the motor, the amount of power applied to the motor is reduced via the pulse-width, as a result of which the speed of the motor decreases due to the internal friction of the motor.

A drawback of the known device is that reducing the speed of the motor proceeds comparatively slowly, i.e., far more slowly than raising the speed of the motor. Thus, in the case of the known device, the motor is not slowed down or braked actively. If the motor speed is temporarily too high, it is necessary to wait until the motor has lost enough speed as a result of friction before operation at a desired speed can be resumed. This slows down the speed control. This is particularly undesirable in the case of CD-ROM drives.

To solve this problem it has been proposed to brake the motor actively by temporarily reversing the direction of flow of the drive signals applied to the motor windings. A drawback of this solution is that it is not possible to obtain a smooth transition from normal operation to active braking. If speed control is used, it is necessary that for such a transition, the current is first reduced to zero, the commutation position is adapted, and the current is raised again. This is rather difficult.

SUMMARY OF THE INVENTION

It is an object of the invention to provide a solution to the problems outlined hereinbefore. To this end, the device in accordance with the invention is characterized in that a first and a second drive signal at a time, are applied to at least one winding of the motor, the first and the second drive signals flowing in opposite directions in the at least one winding, and the device further including pulse-width modulation means for applying a first pulse-width modulation to the first drive signal, and for applying a second pulse-width modulation to the second drive signal, the pulse-width modulation means being adapted to vary the pulse-width of the first-pulse-width modulation with respect to the pulse-width of the second pulse-width modulation, for accelerating, actively decelerating or maintaining the speed of the motor, and, if desired, for selecting a direction of rotation of the motor.

Since the pulse-width of the first pulse-width modulation and that of the second pulse-width modulation can be controlled independently of one another, it is possible to achieve a smooth transition between active speeding-up and active slowing-down (braking) of the motor. Thus, the device in accordance with the invention is capable of actively slowing down, a gradual transition being possible between active slowing-down, stabilization and speeding up of the motor. In fact, there is no longer any difference between active slowing-down and driving. Moreover, the motor in accordance with the invention can be driven in two directions and in each direction of driving, the motor speed can be raised, actively slowed down and maintained constant, as desired.

Particularly, the first duty cycle is selected to be equal to the second duty cycle for stopping the motor.

A further embodiment of the device in accordance with the invention is characterized in that the multi-phase inverter includes at least a first and a second controllable switching element for connecting a first terminal of the first winding, respectively, to a first and a second terminal of a d.c. power supply, and at least a second and a third controllable switching element for connecting a first terminal of the second winding, respectively, to the first and the second terminal of the d.c. power supply, a second terminal of the first winding being electrically connected to a second terminal of the second winding and the pulse-width modulation means generating a first control signal for switching the first switching element, a second control signal for switching the second switching element, a third control signal for switching the third switching elements and a fourth control signal for switching the fourth switching element, the first and the second control signals being pulse-width modulated in such a manner that the first and the second switching elements are not closed concurrently, the third and the fourth control signals being pulse-width modulated in such a manner that the third and the fourth switching elements are not closed concurrently, and the first and the fourth control signals each being pulse-width modulated with a first duty cycle, and the second and the third control signals each being pulse-width modulated with a second duty cycle, the first and the second duty cycles being varied with respect to one another for accelerating, actively decelerating or maintaining the speed of the motor. The advantage of this further embodiment is that the switching circuit, formed by said switching elements, is a switching circuit which is known per se and is frequently used with success. Thus, use can be made of a switching circuit which is known per se and which, in accordance with the invention, can be driven with said control signals in order to drive the motor, enabling the motor speed to be alternatively raised, actively slowed down and maintained constant with a gradual transition.

Preferably, the first and the fourth control signals are equal to one another and in that the second and the third control signals are identical and equal to one another. In accordance with this variant only two mutually different control signals have to be generated.

BRIEF DESCRIPTION OF THE DRAWINGS

The invention will now be described in more detail with reference to the drawing, in which.

DESCRIPTION OF THE PREFERRED EMBODIMENTS

First of all, the operation of a prior-art device for driving a brushless multi-phase d.c. motor will be described with reference to FIG. 1. Subsequently, the device in accordance with the invention will be described with reference to FIG. 1.

Figure 1:
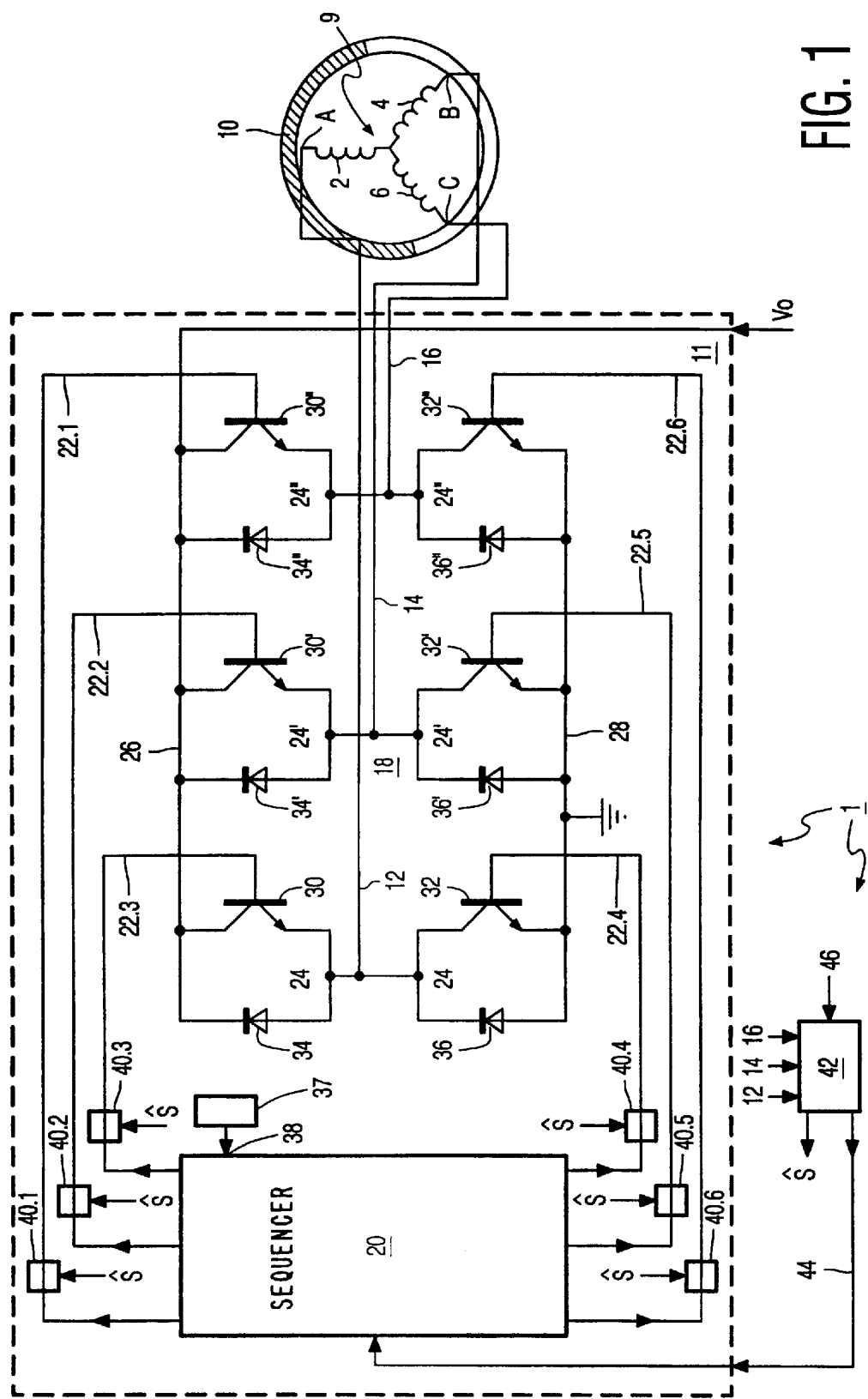
FIG. 1 shows an embodiment of the device in accordance with the invention.

The device shown in FIG. 1, for supplying drive signals to a brushless multi-phase d.c. motor, bears the reference numeral 1. In the present example, the device supplies drive signals to three windings 2, 4, 6 of a three-phase brushless d.c. motor 8. The windings 2, 4, 6 form part of the stator 9 of the motor. The motor 8 further has a rotor 10, which is shown diagrammatically in FIG. 1. The rotor 10 comprises a permanent magnet having a north pole shown in hatched lines. The south pole is shown without hatching.

The windings 2, 4, 6 of the stator of the motor 8 are recurrently supplied with drive signals in a given sequence, in such a manner that the magnetic rotor of the motor is rotated, at least one winding not being supplied with drive signals during given free periods. In the present example, all three windings are not energized with drive signals, recurrently but not concurrently, in given free periods.

The device 1 includes drive means for applying the drive signals to the windings 2, 4, 6 of the motor 8 in said manner. In the present example, the drive means take the form of a multi-phase inverter 11 The drive signals generated by the multi-phase inverter 11 are applied to the windings 2, 4, 6 of the motor 8 via lines 12, 14, 16 in order to drive the motor. The multi-phase inverter 11 in the present example is a three-phase inverter because, in the present example, a three-phase d.c. motor is to be driven. In this example, the multi-phase inverter 11 comprises a power supply circuit 18 and a sequencer 20. Via lines 22.1–22.6, the sequencer 20 drives the power supply circuit sequentially in such a manner that the power supply circuit 18 sequentially, i.e., in a given recurrent sequence, supplies drive signals to the windings 2, 4. 6 in order to drive the motor. The power supply circuit 18 consists of a conventional triple half H bridge. The power supply circuit 18 has three series-connected current paths 24, 24', 24", which are arranged between a supply line 26 and a zero potential 28. In the present example, a supply voltage $V_0$ is applied to the supply line 26, the zero potential line being connected to ground.

Each current path 24, 24', 24" is made up of two series-connected switching elements in the form of transistors 30, 32; 30', 32'; and 30", 32". The transistors 30, 30', 30", 32, 32', 32" may each comprise, for example, a FET known per se, or any other known switching element. Furthermore, each switching element 30, 30', 30", 32, 32', 32" has an associated flyback diode 34, 34', 34", 36, 36', 36", respectively. Each flyback diode is arranged in anti-parallel with the respective switching element. Each flyback diode can be a parasitic diode of the switching element with which it is arranged in parallel. The flyback diodes can drain flyback signals produced by a back emf voltage in a winding during a free period of this winding. The supply lines 12, 14, 16 are connected to respective nodes A, B, C between the switching elements 30, 32; 30', 32'; and 30", 32".

Figures 2, 3:
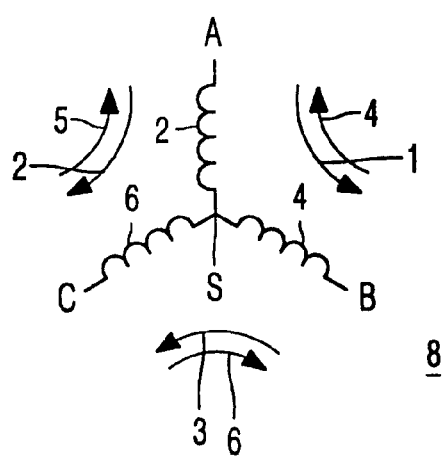
FIG. 2 is a Table to illustrating the operation of the device shown in FIG. 1 when the device drives a multi-phase d.c. motor in a manner known per se.
FIG. 3 diagrammatically represents drive signals applied to the motor by the device shown in FIG. 1.
Figure 4A:
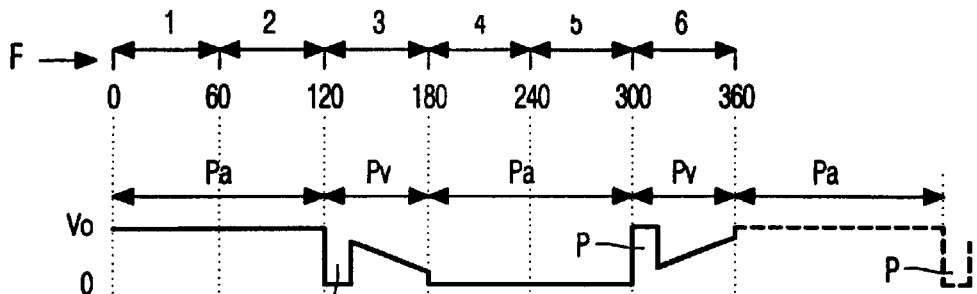
FIG. 4A–4C show a number of diagrams illustrating the operation of the device of FIG. 1 when the motor is driven in accordance with the Table of FIG. 2.
Figure 4B:
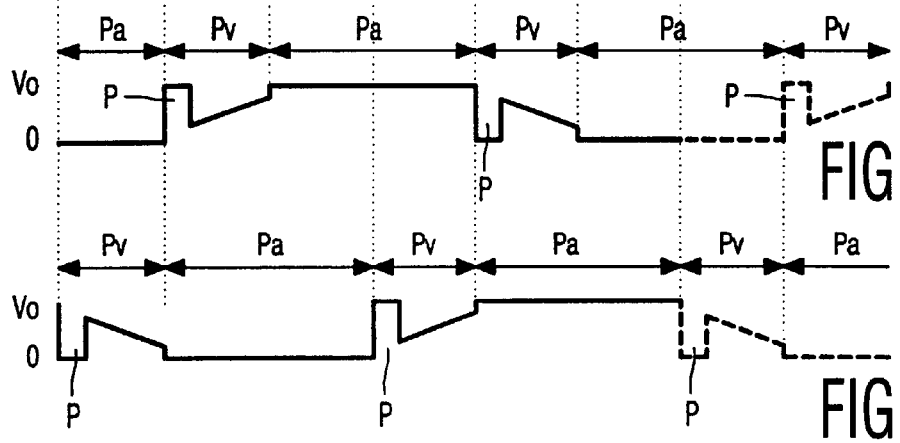
Figure 4C:
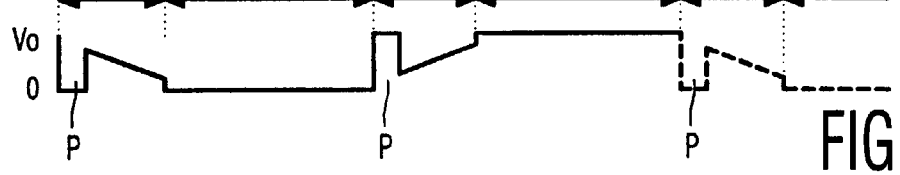

A possible mode of operation of the power supply circuit 18 will be described in more detail with reference to the Table of FIG. 2 and FIGS. 3, and 4A–4C, the power supply circuit being controlled a manner known per se by the sequencer 20. The terminals of the windings 2, 4, 6 are represented by the nodes A, B and C in FIG. 3, and correspond to the nodes A, B, C in FIGS. 1 and 2. When the motor rotates, generally speaking, one node (for example, the node A) is connected to the supply line 26, another node (for example, the node B) is connected to the zero potential line 28, and the last node (for example, the node C) is kept floating. Thus, six different phases are conceivable. For example, in a first phase F, the power supply circuit 18 is controlled via the line 22.3 in such a manner that the switching element 30 is turned on, as a result of which, the node A is connected to the supply line 26. At the same time, in the first phase F, the switching element 32' is controlled via the line 22.5 in such a manner that the node B is connected to the zero potential line 28. During the first phase F, the other switching elements are controlled in such a manner that they are turned off This has the result that, in the first phase F, a drive current starts to flow from the supply line 26 to the node A via the switching element 30, from the node A to the node B via the windings 2 and 4, and from the node B to the line 28 via the switching element 32'. The node C then remains floating. This first phase is illustrated in FIG. 2 and FIG. 3.The first row of FIG. 2 shows that a current flows from the node A to the node B, while the node C is kept floating. In FIG. 3 this current is shown as an arrow marked with an encircled reference numeral (1). In a second phase, in an entirely similar way, a current flows from the node A to the node C, while the node B is kept floating. The other phases, three to six, are shown accordingly in FIG. 2 and FIG. 3. Furthermore, a drive period $P_a$ can be defined as a period in which drive signals are applied to a winding of a motor. Moreover, a free period $P_v$ can be defined as a period in which no drive signal is applied to a winding. FIG. 3 also shows the drive period $P_a$ and the free period $P_v$. From the Figure, it is apparent that drive signals are applied to the motor windings during given drive periods $P_a$, in such a manner that, in the present example, no drive signal is applied to one winding during drive periods $P_a$ of two windings. In addition, the beginning and the end of a free period coincide with a beginning or an end of a drive period, each drive period being twice as long as a free period. In each drive period, a drive pulse whose duration is equal to the duration of the relevant drive period, is applied to the relevant winding.

During the free period $P_v$, as already stated, one of the nodes A, B or C is kept floating. However, if, for example, the node C is kept floating in the first phase, an induction voltage will be generated in the winding 6 due to the rotation of the rotor of the motor. This induction voltage is available between the node C and the star point S of the three windings, and is referred to hereinafter as the back emf signal. Likewise, a back emf signal is produced between the node B and the star point S in the second phase F, and a back emf signal is produced between the node C and the star point S in the third phase F, etc.

The sequencer 20 is of a generally known type and, in the rhythm of a clock signal generated by a clock 37 and applied via the line 38, it generates control signals on the lines 22.1-22.6 which recurrently turn on the switching elements 30, 30', 30", 32, 32', 32" in the sequence given in the Table of FIG. 3. The sequencer 20 may comprise, for example, a shift register, known per se, which is cycled through twice in one electrical revolution of the motor.

FIG. 4 shows, in a first row marked F, the six different phases which occur successively when the motor makes one complete electrical revolution. Rows A, B and C show the respective voltage as a function of time for the nodes A, B and C of the motor. This illustrates, for example, that during the first and the second phases the voltage of the node A is equal to the supply voltage $V_0$. During the third phase, the node A is floating and the back emf signal will be produced in the winding 2. At the beginning of the fourth phase, the voltage on the node A becomes equal to the voltage of the zero point because the node A is connected to the zero potential line 28. This situation is maintained in the fourth and the fifth phase. In the sixth phase, the node A again becomes floating and again a back emf signal is generated. In the node B, the same signal is generated as in the node A, the signal in the node B being 120° shifted in phase with respect to the signal in the node A. Likewise, a signal is generated in the node C which is 240° shifted in phase with respect to the signal in the node A.

In accordance with the invention, the drive signals are pulse-width modulated in a specific manner for speeding up and actively slowing down the motor 8. For this purpose, the multi-phase inverter 11 further comprises pulse-width modulation means 40.1–40.6 for applying pulse-width modulations to the drive signals, which are applied to the motor windings via the lines 12, 14 and 16. The device operates as follows. In the first phase F (see FIG. 5), identical control signals are applied to the switching element 30' and the switching element 32 via the lines 22.2 and 22.4, respectively. With the aid of the pulse-width modulation means 40.2 and 40.4, the control signals on the lines 22.2 and 22.4 applied to the switching means 30' and 32 are pulse-width modulated in an identical manner. This causes a first drive signal to flow from A to B through the windings 2 and 4, this first drive signal made up of successive pulses Q having a pulse-width that can be varied (modulated). The pulse repetition frequency is usually higher than 20 kHz. The pulse-width modulated signal bears the encircled reference numeral (1) in FIG. 3. The hatched portion in FIG. 5 indicates, for the node A in the first phase, that, as a result of the pulse-width modulation with a pulse repetition frequency of approximately 20 kHz, the supply voltage is alternately applied to the node A.

Figure 5A:
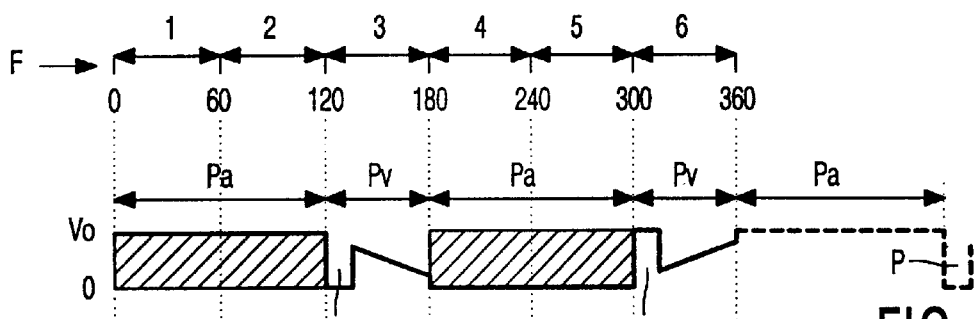
FIG. 5A–5C show a number of diagrams illustrating the operation of the device of FIG. 1 when the motor is driven in accordance with the invention.
Figure 5B:
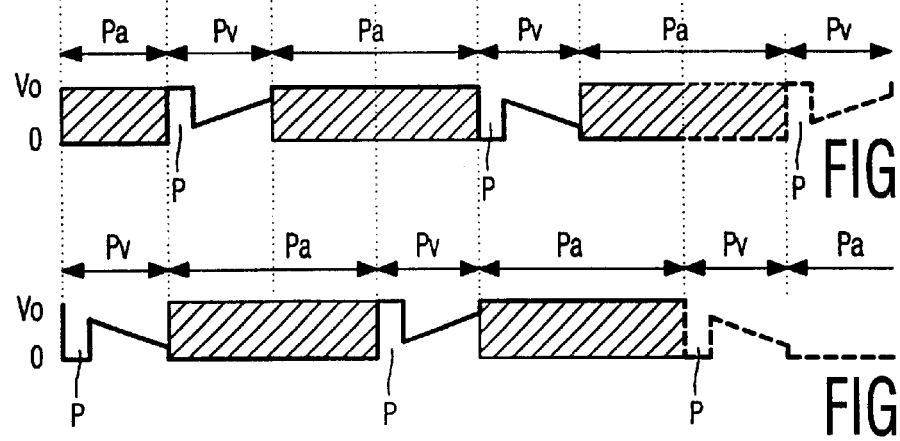
Figure 5C:
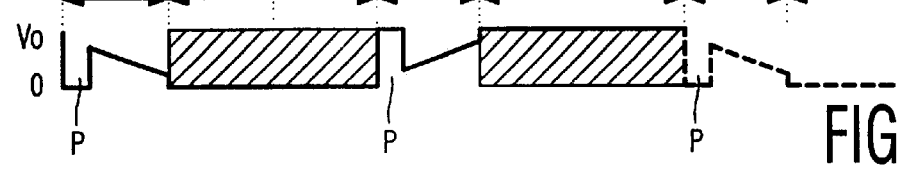

However, at the same time, two identical control signals are applied to the switching elements 30 and 32' via the lines 22.3 and 22.5. These control signals have been pulse-width modulated identically with the aid of the pulse-width modulation means 40.3 and 40.5. This results in a second drive signal 4 (see FIG. 3) through the switching elements 30 and 32', this are being switched, and through the windings 2 and 4, which second drive signal flowing in a direction opposite that of the first drive signal which flows through the windings 2 and 4. The second drive signal is also made up of successive pulses having a pulse width that can be varied (modulated). In FIG. 5, this is illustrated, for the node B, by means of a hatched portion that, in the first phase, the supply voltage $V_0$ is applied to the node B with said pulse repetition frequency of approximately 20 kHz.

The multi-phase inverter 11 is designed in such a manner that the control signal on the line 22.2 and the control signal on the line 22.5 are pulse-width modulated so as to ensure that the switching elements 30' and 32' are not closed concurrently. This is in order to preclude a short-circuit between the lines 26 and 28. Likewise, the control signals on the lines 22.3 and 22.4 are pulse-width modulated in such a manner that the switching elements 30 and 32' are not closed concurrently so as to preclude a short-circuit between the lines 26 and 28. This is further elucidated by means of FIG. 6. To explain the operation of the multi-phase inverter 11 in the first phase F, FIG. 6 only shows the windings 2 and 4 of the motor 8, the switching elements 30, 30', 32, 32' and the diodes 34, 34', 36, 36'.

Figure 7:
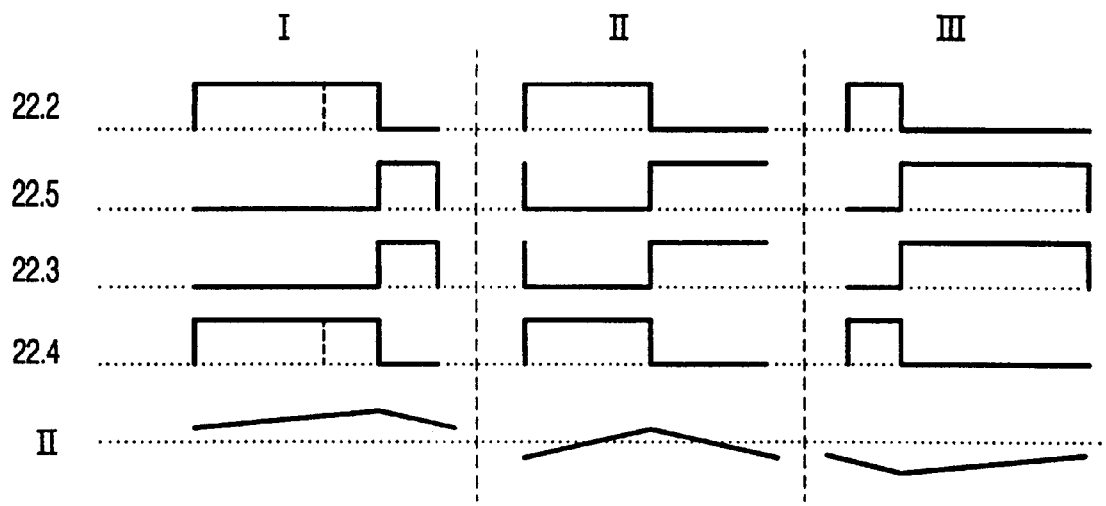
FIG. 7 shows a number of diagrams relating to the control of the part of the device in accordance with the invention shown in FIG. 6.

The afore-mentioned first and second drive signals also bear the encircled reference numerals (1) and (4) in FIG. 3. FIG. 7 shows the control signals applied to the switching elements 30, 32, 30' and 32' via the lines 22.2, 22.3, 22.4 and 22.5, respectively. Situation I in FIG. 7 represents a possible pulse-width modulation of the control signals on the lines 22.2-22.5 for one period of the pulse-width modulation. As stated hereinbefore, the control signals on the lines 22.3 and 22.5 actually appear to be identical. The control signals on the lines 22.2 and 22.4 also appear to be identical. Furthermore, the switching elements 30 and 32 appear never to be closed concurrently, in that the control signals on the lines 22.3 and 22.4 do not close the relevant switching elements at the same time. The control signals on the lines 22.2 and 22.4 cause the pulse-width modulated first drive signal to be passed through the windings 2 and 4, while the control signals on the lines 22.3 and 22.5 cause the pulse-width modulated second drive signal to be passed through the windings 2 and 4 in a direction opposite to that of the first drive signal. Since, as is shown for the pulse-width modulation in situation I, the switching elements 30' and 32 are closed longer, averaged in time, than the switching elements 30 and 32', the average current of the first drive signal (1) will be larger than (and have a direction opposite to) the average current of the second drive signal. (4). The duty cycle of the control signals on the lines 22.2 and 22.3 is therefore greater than the duty cycle of the control signals on the lines 22.3 and 22.5. The effect is that the motor will be driven in a predetermined direction of rotation. When it is desired to slow down the motor actively the duty cycle of the control signals on the lines 22.2 and 22.4 can gradually be reduced, while the duty cycle of the control signals on the lines 22.3 and 22.5 is gradually increased. This results in a situation shown under III in FIG. 7. Since now the magnitude of the second drive signal (4) averaged in time is greater than the magnitude of the first drive signal (1) averaged in time, the motor will be slowed down actively. When the desired speed is attained, the duty cycle can be restored to the situation shown under I.

When the duty cycle of the control signals, as shown for situation I, is thus gradually changed to the duty cycle of the signals in situation III, as shown in FIG. 7, an active deceleration is effected, as already stated. However, if, subsequently, the duty cycles of the control signals are maintained so as to remain as in situation III shown in FIG. 7, the motor will eventually begin to rotate in an opposite direction. Thus, in the device in accordance with the invention, it is possible to drive the motor actively in a first direction, to drive it actively in a second direction, and to slow it down actively in each of the two directions.

When the duty cycle of the control signals on the lines 22.2 and 22.4 is selected to be equal to the duty cycles of the control signals on the lines 22.3 and 22.5, the drive signal (1) and the drive signal (4) will compensate one another and, averaged in time, no drive signal will be passed through the windings 2 and 4. This situation is shown under II in FIG. 7.

FIG. 7 also shows the total current Q through the windings 2 and 4 as a result of the various drive signals in the direction from A to B for the three illustrated situations. This reveals that in the situation I, the current Q rises gradually in response to the control signals on the lines 22.2 and 22.4, and subsequently, decreases gradually under the influence of the control signals on the lines 22.3 and 22.5. However, averaged in time, it results in a current Q from A to B. As already stated, a current from A to B, which is equal to 0, averaged in time is obtained in situation II, while, averaged, in time, a current Q flows in situation III which has a direction opposite to the direction of the current Q for situation I.

In the embodiment described hereinbefore, the sum of the duty cycle of the control signals on the lines 22.2 and 22.4, and the duty cycle of the control signals on the lines 22.3 and 22.5, is 100%. However, this is not necessary. Alterative, if desired, the sum of the duty cycles can be smaller than 100%, for example, in that in situation I, the duty cycle of the control signals on the lines 22.2 and 22.4 is chosen to be smaller (as shown in broken lines).

Figure 6:
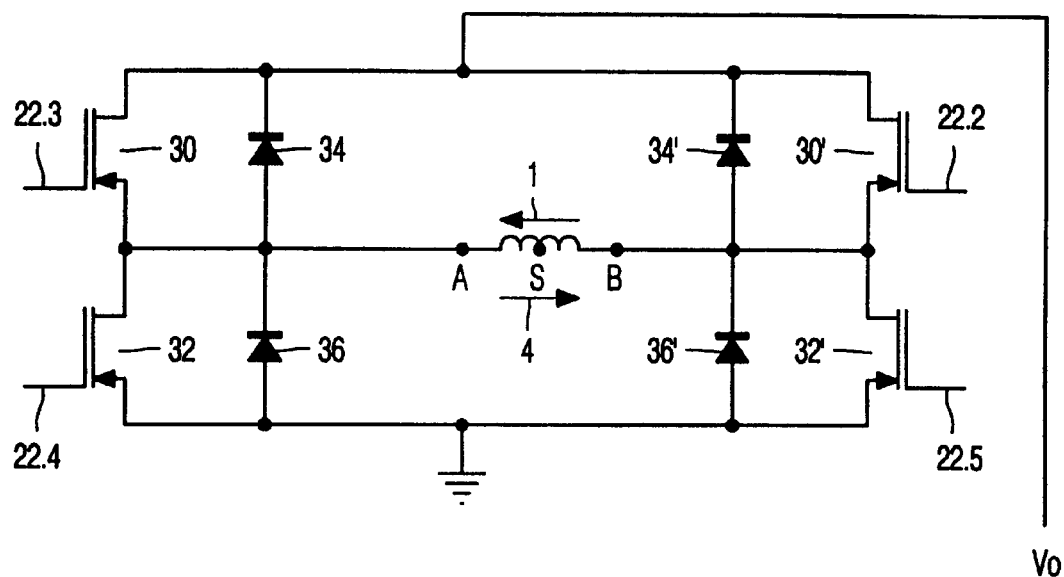
FIG. 6 diagrammatically shows a part of the device shown in FIG. 1.

With the aid of FIGS. 6 and 7, it has been shown how in the first phase F, a first and a second drive signal (1), (4) are applied to the windings 2 and 4 of the motor, the first and the second drive signals (1) and (4) in the two windings having opposite directions, and the pulse-width modulation means applying a first pulse-width modulation to the first drive signal, and a second pulse-width modulation to the second drive signal, the pulse-width modulation means being adapted to vary the pulse-width of the first pulse-width modulation and of the second pulse-width modulation independently with respect to one another for increasing, actively reducing or maintaining the speed of rotation of the motor and, if desired, selecting the direction of rotation of the motor.

In the second phase F, in complete similarity to what has been shown in FIG. 5, the control signals on the lines 22.2 and 22.4 as shown in FIG. 7 are applied to the switching elements 30' and 32. However, the control signals, as shown in FIG. 7 for the lines 22.3 and 22.5, are now applied to the lines 22.1 and 22.6. Thus, the first drive signal in the second phase F is now the drive signal denoted by an encircled (2) in FIG. 3, while the second drive signal in the second phase F is the drive signal denoted by an encircled (5) in FIG. 3. Again, the two drive signals have opposite directions and are each pulse-width modulated. This is wholly similar to what has been described for the first phase F. To drive the motor in the afore-mentioned predetermined direction, the drive signal (2), averaged in time, will also be greater than the drive signal (5). For actively slowing down the motor, the duty cycles of both drive signals are adapted in such a manner that, averaged in time, the drive signal (5) is greater than the drive signal (2). Similarly, in the third phase F, the first drive signal bears the reference numeral (3) while the second drive signal bears the reference numeral (6). In the fourth phase F, the first drive signal bears the reference numeral (4) and the second drive signal bears the reference numeral (1). Subsequently, in the fifth phase F, the first drive signal is referenced (5) and the second drive signal is referenced (2). Finally, in the sixth phase F, the first drive signal has the reference numeral (6) and the second drive signal has the .251 reference numeral (3). Thus, each of the phases of the device, in accordance with the invention for driving the three-phase d.c. motor, has been considered.

Figure 8:
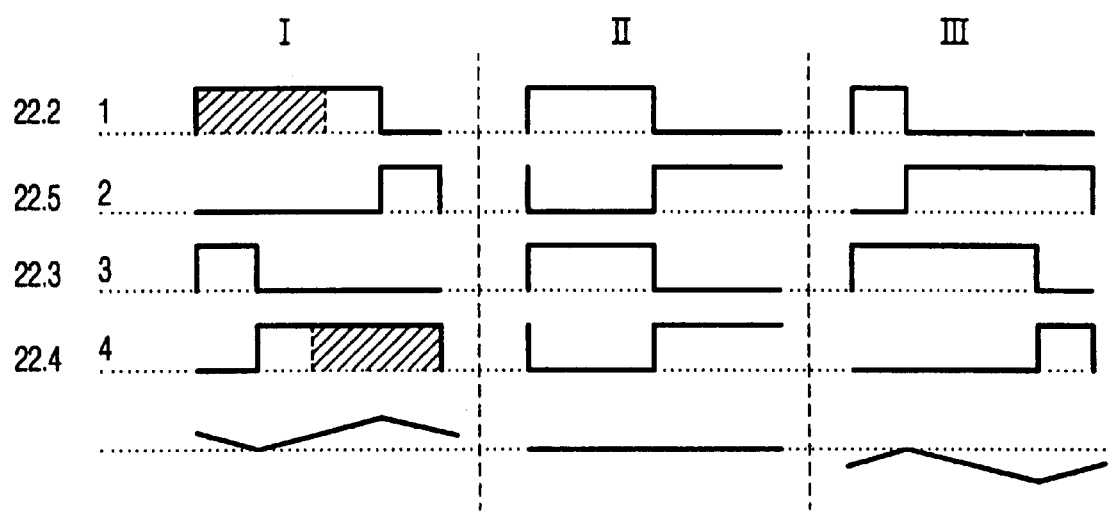
FIG. 8 shows a number of diagrams relating to an alternative control method for the part of the device in accordance with the invention shown in FIG. 6.

FIG. 8 shows an alternative embodiment for the first phase F, in accordance with which, the control signals on the lines 22.2–22.5 can be generated. Also, in this case, the control signal on the line 22.2 and the control signal on the line 22.5 switch the switching elements 30' and 32' in such a manner that they are not closed concurrently. The control signals on the lines 22.3 and 22.4 neither close the switching elements 30 and 32 at the same time. However, in the present case the control signals each differ from one another in such a way that, each time, the beginning of a pulse of the control signal on the line 22.2 coincides with the end of a pulse of the control signal on the line 22.4. Likewise, the beginning of a pulse of the control signal on the line 22.3 coincides with the end of the control signal on the line 22.5.

If the duty cycle of each of the control signals on the lines 22.2–22.5 is varied as described with reference to the motor will be driven in a wholly similar manner. Thus, for the selected duty cycles as shown in situation I in FIG. 8, the time-averaged current Q is also equal to the time-averaged current Q in the situation I in FIG. 7. The average current generated in the relevant windings in the situations II and III in FIG. 8, also corresponds to the average current Q generated in the situations II and III in FIG. 7.

Also for the embodiment shown in FIG. 8, the sum of the duty cycle of the control signals generated on the lines 22.2 and 22.4 and the duty cycle of the control signals generated on the lines 22.3 and 22.5 is 100%. However, it is alternatively possible for the sum of the duty cycles to be smaller than 100% if, for example, the pulse-width of the control signals generated on the lines 22.2 and 22.4 is reduced (as is shown in broken lines in FIG. 8). The resulting pulse-width is shown as a hatched area. Such variants are considered to fall within the scope of the invention.

In the present example, the pulse-width modulators 40.1–40.6 are controlled by a control device 42. The control device 42 generates control signals S, which are applied to the pulse-width modulators 40.1–40.6. The control device 42 also generates signals for controlling the sequencer 20 on the line 44.

Figure 9:
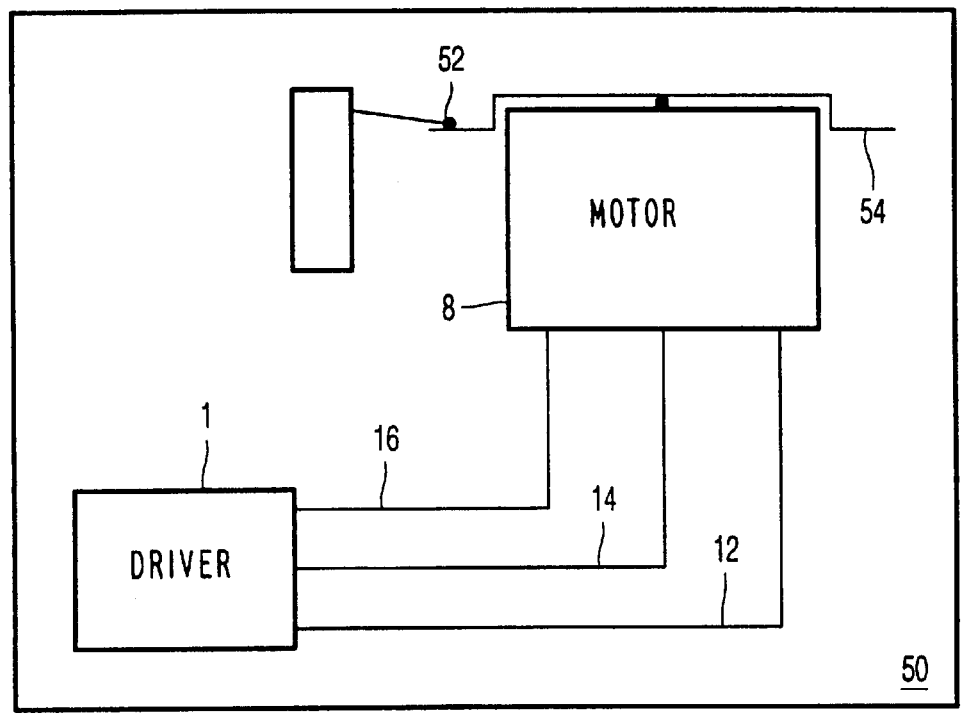
FIG. 9 shows a CD-ROM drive including a device as shown in FIG. 1.

Furthermore, the signals from the lines 12, 14 and 16 can be applied to the control device 42. In a manner known per se, the control device 42 can determine the speed of the motor on the basis of the back emf signals generated on these lines 12, 14 and 16. If a desired speed is input to control device 41 via the line 46, the control device 42 can adjust the speed to the desired value by speeding up or actively slowing down the motor by controlling the pulse-width modulations of the drive signals as described hereinbefore. The control device 42 can also select the direction of rotation of the motor by controlling the pulse-width modulations. The device 1 and the motor 8 shown in FIG. 1 can be used to great advantage in a CD-ROM disk drive 50 as shown in FIG. 9. The CD-ROM disk drive 50 has a read and, at option, write head for reading information from a CD-ROM 54 and, if applicable, writing information onto the CD-ROM 54. Since the speed of the motor 8 of the CD-ROM disk drive 50 is to be varied frequently and rapidly, it is particularly advantageous to use the device in accordance with the invention in a CD-ROM disk drive. Such variants are each considered to fall within the scope of the invention.

What is claimed is:

1. A device for driving a multi-phase d.c. motor having a plurality of windings, said device comprising
   a multi-phase inverter comprising:
   drive signal generating means for generating drive signals for application to the windings of the motor such that said windings are recurrently driven in a given sequence by the drive signals; and
   means for pulse-width modulation of the drive signals to control the speed of the motor, characterized in that said drive signal generating means applies a first and a second of said drive signals simultaneously to at least one of the windings of the motor, the first and the second drive signals flowing in opposite directions in the at least one winding, and the pulse-width modulation means applies a first pulse-width modulation to the first drive signal and a second pulse-width modulation to the second drive signal, the pulse-width modulation means varying a pulse-width of the first pulse-width modulation with respect to a pulse-width of the second pulse-width modulation, for accelerating, actively decelerating or maintaining a speed of the motor and for selecting a direction of rotation of the motor.

2. The device as claimed in claim 1, characterized in that said pulse-width modulation means increases a first duty cycle of the first drive signal with respect to a second duty cycle of the second drive signal for accelerating or actively decelerating the motor, while said pulse-width modulation means reduces the first duty cycle with respect to the second duty cycle, respectively, for actively decelerating or accelerating the motor.

3. The device as claimed in claim 2, characterized in that said pulse-width modulation means increases the first duty cycle and reduces the second duty cycle, respectively, for accelerating and actively decelerating the motor, while said pulse-width modulation means reduces the first duty cycle and increases the second duty cycle, respectively, for actively decelerating and accelerating the motor.

4. The device as claimed in claim 2, characterized in that said pulse-width modulation means makes the first duty cycle equal to the second duty cycle for stopping the motor.

5. The device as claimed in claim 1, characterized in that a voltage difference produced across the at least one winding by the first drive signal is equal and opposite to a voltage difference produced across the at least one winding by the second drive signal.

6. The device as claimed in claim 1, characterized in that the multi-phase inverter further comprises at least a first and a second controllable switching element for connecting a first terminal of the first winding, respectively, to a first and a second terminal of a d.c. power supply, and at least a third and a fourth controllable switching element for connecting a first terminal of the second winding respectively to the first and the second terminal of the d.c. power supply, a second terminal of the first winding being electrically connected to a second terminal of the second winding, the pulse-width modulation means generating a first control signal for switching the first switching element, a second control signal for switching the second switching element, a third control signal for switching the third switching elements and a fourth control signal for switching the fourth switching element, the first and the second control signal being pulse-width modulated such that the first and the second switching element are not closed concurrently, the third and the fourth control signal being pulse-width modulated such that the third and the fourth switching element are not closed concurrently, and the first and the fourth control signal each being pulse-width modulated with a first duty cycle and the second and the third control signal each being pulse-width modulated with a second duty cycle, said pulse-width modulation means varying the first and the second duty cycles with respect to one another for accelerating, actively decelerating or maintaining the speed of the motor.

7. The device as claimed in claim 6, characterized in that said pulse-width modulation means increases the first duty cycle and reduces the second duty cycle, respectively, for accelerating and actively decelerating the motor, while said pulse-width modulation means reduces the first duty cycle and increases the second duty cycle, respectively, for actively decelerating and accelerating the motor.

8. The device as claimed in claim 6, characterized in that the first and the fourth control signals are equal to one another, and in that the second and the third control signals are equal to one another.

9. The device as claimed in claim 6, characterized in that, each time, a beginning of a pulse in the first control signal coincides with an end of a pulse in the fourth control signal, and in that, each time, a beginning of a pulse in the third control signal coincides with an end of a pulse in the second control signal.

10. The device as claimed in claim 6, characterized in that said pulse-width modulation means makes the first duty cycle equal to the second duty cycle for stopping the motor.

11. The device as claimed in claim 6, characterized in that a sum of the first and the second duty cycles is 100 per cent.

12. A drive system comprising a multi-phase d.c. motor and a device for driving the multi-phase d.c. motor as claimed in claim 1.

13. A disk drive including a drive system comprising:
a multi-phase d.c. motor; and
a device for driving the multi-phase d.c. motor as claimed in claim 1.

* * * * *

Disclaimer 6,265,841—Henricus C. J. Büthker, Eindhoven, (NL). DEVICE FOR DRIVING A MULTI-PHASE D.C. MOTOR. Patent dated July 24, 2001. Disclaimer filed March 28, 2008, by the assignee, U.S. Philips Corporation.

Hereby enters this disclaimer to all claims of said patent.

(*Official Gazette October 7, 2008*)